3,253,041
PRODUCTION OF DICHLOROACETALDEHYDE
Sidney Berkowitz and John H. Blumbergs, Highland Park, N.J., assignors to FMC Corporation, New York, N.Y., a corporation of Delaware
No Drawing. Filed Mar. 7, 1963, Ser. No. 263,410
4 Claims. (Cl. 260—601)

The present invention is concerned with an improvement in the production of dichloroacetaldehyde (DCA) by the chlorination of acetaldehyde or its cyclic polymers.

Dichloroacetaldehyde is employed as an intermediate in producing an insecticide, 1,1-di-(4-chlorophenyl)-2,2-dichloroethane (DDD) which is an analogue of DDT. In this process, high-purity dichloroacetaldehyde is desirable in order to obtain a final product having a clear color and a good set point.

One current method for producing dichloroacetaldehyde is carried out by chlorinating either paraldehyde or acetaldehyde in two successive steps, during which hydrogen chloride gas is evolved. In the initial step, stoichiometric quantities of chlorine and aldehyde are mixed in the first reactor at a temperature of about 75–80° C. The partially chlorinated product is then transferred to a second vessel and there subjected to additional chlorination with excess chlorine. The amount of chlorine which is added is regulated depending upon the rate of the chlorine reaction. This can be measured by analyzing the effluent gases to determine the quantity of hydrogen chloride which is present. The principal reaction which takes place is illustrated below:

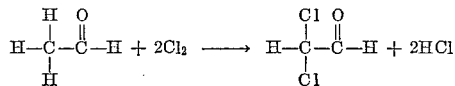

In addition to the principal reaction illustrated above, appreciable side reactions result in the formation of monochloroacetaldehyde (MCA), trichloroacetaldehyde (TCA), and high-boiling polymeric substances.

Monochloroacetaldehyde is a particularly offensive impurity because it results in the production of an inferior grade of DDD insecticide, identified above. Removal of the monochloroacetaldehyde from the dichloroacetaldehyde is difficult by conventional distillation because the monochloroacetaldehyde boils only three degrees below the dichloroocetaldehyde. The high-boiling polymeric side-products are also objectionable because they reduce the yield of the dichloroacetaldehyde and because on standing they tend to cause the final dichloroacetaldehyde to solidify. Further, the high-boiling impurities, on standing, deposit throughout the equipment, requiring periodic clean-outs.

One method for reducing the concentration of monochloroacetaldehyde in the dichloroacetaldehyde product is taught in co-pending application Serial No. 148,855, filed October 31, 1961 now U.S. Patent No. 3,150,189 in the name of David Centola et al. These co-workers have found that if one of a small class of organic acids are present during the chlorination of the acetaldehyde, the concentration of the monochloroacetaldehyde in the final product is extremely low. However, these organic acid additives are not effective in reducing the amount of high-boiling polymeric side-products produced. As a result, there is a need for a process that permits selective chlorination of acetaldehyde to form a dichloroacetaldehyde product without the production of undesirable products such as monochloroacetaldehyde and high-boiling polymeric side-products.

We have now found that acetaldehyde or its cyclic trimer, paraldehyde, can be selectively chlorinated to form dichloroacetaldehyde with materially reduced amounts of both monochloroacetaldehyde and high-boiling polymers, by carrying out the chlorination in the presence of about 1 or more percent (and preferably about 1 to 3½ percent) by weight of phosphoric acid.

In addition, we have found most unexpectedly that the process produces a DCA product having unusual stability against polymerization.

The stability of the presently produced DCA product against polymerization is completely unexpected because this type of stability has heretofore never been obtained. The reason for this unexpected stability is unknown but is directly attributable to the use of the phosphoric acid catalyst since in the absence of this catalyst, the DCA product polymerizes in a relatively short time, i.e., within two weeks. Other catalysts which have been suggested in the production of dichloroacetaldehyde i.e., water, para-toluene-sulfonic acid, benzene-sulfonic acid, etc. do not prevent the polymerization of the DCA product.

The process of this invention is carried out by chlorinating acetaldehyde or paraldehyde in a single-stage procedure or in a plurality of stages. While single stage operation is possible, a two-stage procedure permits better chlorination and is the preferred embodiment. It is preferred to use paraldehyde as the feed material because it has a higher boiling point than acetaldehyde, and therefore, can be maintained at higher temperatures under atmospheric pressures. The paraldehyde is added to the first reactor and chlorine gas is added to the liquid. The chlorine gas is normally added in stoichiometric amounts and hydrogen chloride and unreacted chlorine gas are removed overhead. Since the chlorination reaction is exothermic, cooling means are employed for maintaining the mixture at temperatures of between 75–80° C. The partially chlorinated product is then passed into a second stage where excess chlorine is passed through the solution until conversion to dichloroacetaldehyde is completed.

The phosphoric acid catalyst can be added at either or both of the reaction stages, and is most conveniently introduced by adding it into the reaction vessel with the feed stream. The method of introduction into the reaction vessel is immaterial provided that the catalyst is present when chlorination takes place. The phosphoric acid catalyst is added in amounts of from about 1 to about 3½ percent by weight of the reaction mixture. Larger quantities of the catalyst do not increase its effectiveness because of the limited solubility of phosphoric acid in the reaction mixture. Accordingly, amounts of phosphoric acid over 3½ percent merely are helpful in assuring that the maximum solubility of phosphoric acid is obtained in the reaction mixture. There is no upper limit on the amount of phosphoric acid which may be present, since undissolved acid is inert in the reaction, and may be recovered on distillation of the product. Obviously, amounts of phosphoric acid in excess of about 10% become uneconomical.

The phosphoric acid catalyst should be added in as concentrated a form as possible to prevent the addition of large quantities of water into the system. The presence of material amounts of water results in the production of poor quality DCA product, and should be excluded from the system whenever possible. Concentrated phosphoric acid having a concentration above about 85% by weight has been found satisfactory, although 100% acid is preferred. The form of the phosphoric acid, whether it be as the ortho-, meta- or para-phosphoric acid, is immaterial to the operation of the present process.

The present process can be carried out in either a continuous manner or in a batch process. Continuous operation is preferred, since greater yields of product can be obtained with the same size equipment. In a continuous process, the catalyst is added continuously to the feed stream. The reaction mixture should be maintained at temperatures of from about 50–85° C., and best results normally are obtained when temperatures of from about 75–80° C. are utilized.

The presence of the phosphoric acid catalyst during chlorination results in a selective chlorination of the aldehyde feed with a marked reduction in the formation of both monochloroacetaldehyde (MCA) and high-boiling polymers. In addition, the presence of the phosphoric acid catalyst also results in certain ancillary benefits. Initially, the acid catalyst acts as a depolymerization agent in that it depolymerizes some of the existing polymers present in the reaction mixture. These polymers are frequently introduced into the reaction mixture as part of the "heel" of the previous dichloroacetaldehyde product during normal batch operations. In the case of a continuous process, the catalyst keeps the high-boiling polymers at an extremely low level.

Another advantage is that the rate of chlorination of the aldehyde is substantially increased over conventional processes not employing catalysts. This is most desirable since it facilitates carrying out the reaction in shorter times and permits more product to be produced in a given reactor.

A further and most important advantage to the present process is the increased stability which the resultant DCA product exhibits. The stability of the DCA product is extremely important because conventionally produced DCA cannot be stored for any length of time without polymerizing into a solid mass. To retard such polymerization upon storage, it is customary to add various stabilizers to the DCA. However, these stabilizers are only effective in retarding polymerization for a limited amount of time, not in preventing polymerization. By contrast, the DCA product produced in accordance with the present process has been found to resist polymerization upon exetnded storage and in the absence of a stabilizer.

The inherent stability of the instant DCA product is important to manufacturers because the DCA does not have to be produced within a limited time of the intended use. The instant process permits the manufacturer to produce DCA at his convenience and then store the product without danger of polymerization and degradation. In addition, any extended delays incurred during transit no longer are of critical importance with the instant product, since polymerization upon prolonged standing does not occur.

The following examples are given to illustrate the present invention and are not deemed limitative thereof.

*Example 1*

Two 1000-ml. 3-necked flasks with overflow ports at the 740 g. level were connected in series to permit the primary chlorinator to overflow by gravity into the secondary chlorinator. Each flask was equipped with a mechanically agitated Teflon paddle stirrer, thermometer, and water condenser.

The primary chlorinator was charged with a 409 g. heel of DCA product, assaying 82.4% DCA, 4.6% MCA, 4.9% TCA and 7.9% still bottoms, and was heated to 75° C. Chlorine was added to the primary chlorinator at 1.05 g./min. along with the paraldehyde, which was added at 0.327 g./min. After 9 hrs., the volume in the primary chlorinator increased to the overflow port. Samples of the overflow were analyzed and assayed 64% DCA, 15% MCA, 2.5% TCA and 16% still bottoms.

The two flasks were connected and the primary chlorinator product permitted to overflow continuously into the secondary chlorinator containing 182 g. of a second heel of DCA product, assaying 90.3% DCA, 4.7% MCA and 5% TCA. The H₃PO₄ catalyst was added to the secondary chlorinator in the amount of 3½ percent. Chlorine was metered into the secondary chlorinator at the rate of 0.12 g./min. for a total of 15 hrs. The temperature in the secondary chlorinator was maintained at 75–80° C. Thereafter, the entire reaction mixtures in the two chlorinators were distilled and analyzed. The distillate from the primary chlorinator weighed 451 g. and analyzed 77.5% DCA, 19.3% MCA, 3.6% TCA. The remaining still bottom weighed 100 g. and assayed 20% DCA, 8% MCA, 1% TCA and 71% high boilers. The distillate from the secondary chlorinator weighed 1000 g. and analyzed 89% DCA, 2% MCA, 8% TCA and 0.0% high boilers. The remaining still bottom weighed 100 g. and assayed 24% DCA, 3% MCA, 2% TCA and 71% high boilers. The yields of products are shown in Table I.

TABLE I

|  | Primary Chlorinator Yield (Based on paraldehyde feed) | Secondary Chlorinator Yield (Based on primary chlorinator feed of 51.5 g./hr. for 15 hrs.) |
|---|---|---|
| DCA | 49.9% | 87.5% |
| MCA | 26.3% | 2.1% |
| TCA | 1.3% | 9.1% |
| High boilers | 17.5% | 0.8% |

This example demonstrates the high selective chlorination which takes place in the presence of the phosphoric acid catalyst. In the primary chlorinator, carried out in the absence of a phosphoric acid catalyst, the formation of high boilers increased from 32 g. up to 77.3 g. In the secondary chlorinator, carried out in the presence of phosphoric acid catalyst, the contents of the primary chlorinator that overflowed into the secondary chlorinator (including high boilers) were subjected to additional chlorination. In this chlorination, the amount of high boilers decreased to 70.8 g. indicating no additional high-boiler formation, but rather that some of the high boilers were depolymerized. The total high-boiler formation was only 0.8% for the system and the MCA content was reduced to 2.1%.

*Example 2*

The same equipment was employed as outlined in Example 1 except that only one reactor was used. To a 245 g. heel of DCA product, assaying 80.2% DCA, 6.3% MCA, 5.2% TCA and 8.2% high boilers, was added 13.5 g. of 100% phosphoric acid. A primary chlorinator product, assaying 77.5% DCA, 11.2% MCA, 5.7% TCA, and 5.4% high boilers, was metered into the reactor at a rate of 0.48 g./min. with simultaneous chlorine flow of 0.09 g./min. The total addition time was 4.5 hrs. The reaction mixture was distilled and yielded 361.4 g. of distillate and 23.5 g. of residue. The distillate and residue were analyzed and are reported in Table II.

TABLE II

|  | Distillate (361.4 g.), wt. (g.) | Still Bottoms (23.5 g.), wt. (g.) |
|---|---|---|
| TCA | 28.9 | 0.5 |
| DCA | 317.0 | 5.8 |
| MCA | 8.2 | 0.6 |
| High boilers | 7.4 | 16.5 |

This example demonstrates the depolymerization action of the phosphoric acid in that the starting mixture contained 33.8 g. of high boilers whereas the final reaction products contain only 23.9 g. of high boilers. Thus, not only does the phosphoric acid prevent the conversion of the acetaldehyde to high boilers, but also decreases the high-boiler content initially present in the reaction mixture, thereby acting as a depolymerizing agent.

*Example 3*

The same equipment was employed in this example as in Example 2. The flask was charged with a 200 g.

heel of DCA product, assaying 89.5% DCA, 2.0% MCA, 7.2% TCA, 1.2% high boilers and 5% phosphoric acid ($H_3PO_4$). Paraldehyde was added at a rate of 1 g./min. along with chlorine at a rate of 3.1 g./min. for 1.6 hrs. The paraldehyde feed was terminated and chlorine flow continued at a reduced rate of 1.6 g./min. for an additional 3 hrs. The reaction mixture was distilled and yielded a distillate of 422.7 g. and a residue of 11.2 g. The distillate and residue were analyzed and are reported in Table III.

TABLE III

|  | Distillate (422.7 g.), wt. percent | Still Bottoms (11.3 g.), wt. percent |
|---|---|---|
| TCA | 7.6 | 3.75 |
| DCA | 91.6 | 24.9 |
| MCA | 0.96 | 0 |
| High Boilers | None | 71.4 |

Example 4

This example is carried out in the same manner as Example 3 and with the same equipment except that the starting heel was 234 g. of partially polymerized aged DCA product, assaying 55% DCA, 7% MCA, 2% TCA and 36% high boilers. The final distilled product after chlorination as carried out in the example, assayed 93% DCA, 0.9% MCA and 5% TCA.

Example 5

The following procedures were used for producing DCA with various catalysts to determine the stability of the resulting DCA product in the absence of any added stabilizer. These runs were carried out with 200 g. of the chlorinated product from a primary chlorinator, assaying 78% DCA, 11% MCA, 6% TCA, 0.2% acetaldehyde and 5.4% high boilers. The 200 g. charge was added to a reactor and subjected to chlorination until the MCA content in the reactor was 1% or less and the resultant reaction mixture was then distilled. The rates of chlorination, the time of chlorination, the yields, and the composition of the distillate products are reported in Table IV. The resultant product was placed in a closed container, stored and observed for polymerization. The results are reported below.

TABLE IV

| Catalyst | Weight percent added | Chlorination time (hrs.) | Average Chlorination rate [1] | Percent Yield [2] | Product Composition | | | Product Stability |
|---|---|---|---|---|---|---|---|---|
|  |  |  |  |  | MCA | DCA | TCA |  |
| Phosphoric acid | 5 | 4 | 37.5 | 97.0 | 0.4 | 94.0 | 5.0 | No polymerization after 1 year, assay remained constant. |
| Water | 3 | 5 | 19.8 | 93.0 | 1.0 | 94.0 | 4.0 | Polymerized within 2 weeks. |
| Para-toluene-sulfonic acid | 3 | 2 | 60.2 | 95.0 | 0.4 | 93.0 | 4.0 | Polymerized into a solid mass after standing for 2 hours. |
| None |  | ([3]) |  |  | 9.8 | 79.9 | 4.5 | Polymerized into a solid mass within 2 weeks. |

[1] G. of chlorine reacted per liter of reaction mixture per hour.
[2] Percent yield based on primary chlorinated product employed as starting material.
[3] Extended chlorination with excess chlorine does not reduce the MCA content below about 10%.

Example 6

This example was carried out in the same manner as Example 4 except that an equivalent amount of acetaldehyde was employed in place of paraldehyde. The final distilled product obtained was on the same order as that of Example 4, assaying 92% DCA, 1% MCA and 5% TCA.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. In the process of producing dichloroacetaldehyde wherein an aldehyde selected from the group consisting of acetaldehyde and paraldehyde is reacted with chlorine in substantially stoichiometric proportions at temperatures of from about 50–85° C. in the presence of a heel consisting essentially of chlorinated products of said aldehyde, and wherein substantial amounts of monochloroacetaldehyde and high-boiling side-products are produced, the improvement which comprises carrying out said reaction in the presence of from about 1–10% by weight of phosphoric acid, and recovering a dichloroacetaldehyde product substantially reduced in both monochloroacetaldehyde and high-boiling polymers, and having increased resistance to polymerization.

2. Process of claim 1 in which said phosphoric acid is present within the range of about 1 to about 3½% by weight.

3. In the process of producing dichloroacetaldehyde by the reaction of an aldehyde selected from the group consisting of acetaldehyde and paraldehyde with chlorine in substantially stoichiometric proportions in a two-step chlorination process at temperatures from about 50–85° C. in the presence of a heel consisting essentially of the chlorinated products of said aldehyde, and wherein substantial amounts of monochloroacetaldehyde and high-boiling side-products are produced, the improvement which comprises carrying out said chlorination in at least one of said two stages in the presence of phosphoric acid in amounts of from about 1% to the maximum solubility of said phosphoric acid in said reaction mixture, and recovering a dichloro acetaldehyde substantially reduced in both monochloroacetaldehyde and high-boiling polymers and having increased resistance to polymerization.

4. The process of claim 3 in which the aldehyde is paraldehyde.

References Cited by the Examiner

UNITED STATES PATENTS 2,552,934  5/1951  Cave et al. _____ 260—601
2,832,803  5/1957  Eaker _____ 260—539

OTHER REFERENCES

Groggins: Unit Processes in Org. Syn., 5th edition, pages 233–234, 1958.

LEON ZITVER, *Primary Examiner.*

HAROLD G. MOORE, *Examiner.*